United States Patent
Gies et al.

(10) Patent No.: US 6,625,551 B1
(45) Date of Patent: Sep. 23, 2003

(54) FAULT CURRENT AND DIFFERENTIAL CURRENT DETECTION SYSTEM CAPABLE OF PREVENTING SPURIOUS TRIGGERING OF A PROTECTION SYSTEM DUE TO TRANSIENT INTERFERENCE PULSES

(75) Inventors: Stefan Gies, Regensburg (DE); Reinhard Schmid, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 608 days.

(21) Appl. No.: 09/589,802

(22) Filed: Jun. 9, 2000

(51) Int. Cl.⁷ ............................. G06F 19/00; H02H 3/00
(52) U.S. Cl. .......................................... 702/58; 361/97
(58) Field of Search ........................ 702/58, 60, 64, 702/65; 361/42, 44, 45, 93.1, 93.9, 94, 97

(56) References Cited

U.S. PATENT DOCUMENTS

| | | | | |
|---|---|---|---|---|
| 5,195,008 A | * | 3/1993 | Harr | 361/42 |
| 5,309,311 A | * | 5/1994 | Ballada | 361/48 |
| 5,737,167 A | * | 4/1998 | Bachl | 361/79 |
| 5,808,844 A | * | 9/1998 | Schiel et al. | 361/45 |
| 5,917,687 A | * | 6/1999 | Fleckenstein | 361/45 |
| 6,392,422 B1 | * | 5/2002 | Kammer et al. | 324/650 |
| 6,407,894 B1 | * | 6/2002 | Bilac et al. | 361/44 |
| 6,437,954 B1 | * | 8/2002 | Harr | 361/45 |
| 6,442,010 B1 | * | 8/2002 | Kasztenny et al. | 361/63 |

\* cited by examiner

*Primary Examiner*—Patrick Assouad
(74) *Attorney, Agent, or Firm*—Sughrue Mion, PLLC

(57) ABSTRACT

A fault or differential current detection system is provided. The detection system detects a fault or differential current generated on a conductive path supplying power to an electric device and prevents the fault or differential current from being supplied to the electric device. The detection system comprises a detector, a switch, and a controller. The detector detects a detected current generated on the conductive path and outputs a corresponding detection signal. The controller inputs the detection signal and determines if the detected current is greater than or equal to a first predetermined current threshold based on the detection signal. Then, the controller refrains from outputting a control signal to the switch for a predetermined delay period after the detected current becomes greater than or equal to the first predetermined current threshold. Then, the controller determines if the detected current is greater than or equal to a second predetermined current threshold when the predetermined delay period is over. After the detected current becomes greater than or equal to the second predetermined current threshold, the controller determines if the detected current is a fault or differential current. When the detected current is a fault or differential current, the controller outputs the control signal to the switch to instruct the switch to isolate the fault or differential current from the electric device. A software program executed by the controller is also provided.

43 Claims, 4 Drawing Sheets

FAULT CURRENT AND DIFFERENTIAL CURRENT DETECTION SYSTEM CAPABLE OF PREVENTING SPURIOUS TRIGGERING OF A PROTECTION SYSTEM DUE TO TRANSIENT INTERFERENCE PULSES

FIELD OF THE INVENTION

The present invention relates to a detection system that detects fault currents and differential currents that are supplied to an electric device and triggers a protection switch to prevent such currents from being supplied to the electric device. More particularly, the present invention relates to a detection system that triggers the protection switch when harmful fault currents and differential currents are detected and that does not erroneously trigger the protection switch when harmless transient interference pulses are detected. In addition, the present invention relates to a method performed by the detection system and a software program for implementing the method.

BACKGROUND OF THE INVENTION

In many applications, electrical currents are supplied to one or more electric devices to provide power for the devices. For example, electrical currents are supplied from a power company to one or more electrical outlets in a residential home, and a user can connect an electric device to an outlet to supply power to the device. If the electric device malfunctions or is mishandled by the user, a potentially dangerous situation may arise. For example, if the user contacts a portion of the electric device that receives electrical currents from the power company, the electrical current will pass through the user to the ground and may cause the user's heart to suffer from a cardiac arrest. Also, if the portion of the electric device that receives electrical currents is improperly grounded due to faulty insulation, a large amount of current will be supplied to the electric device and may start a fire in the user's home. The additional surge of current that is supplied to the user's home when the electric device malfunctions or is mishandled is known as a fault current.

In order to prevent fire in the user's home or to prevent the user from being harmed, a circuit breaker has been developed that detects fault currents and that blocks the supply of electrical current to the one or more electrical outlets in the user's home if the detected fault currents exceed certain levels. FIG. 5 shows an example of such a circuit breaker 1, which comprises a sum-current transformer 2, a power supply 4, triggering circuit 5, a triggering relay 6, a switching mechanism 7, and a switch 8.

The electric currents are supplied from the power company to the user's home via a conductor network LN, and the network LN includes three active conductors $L_1$, $L_2$, and $L_3$ and a neutral or ground conductor N. The conductor network LN is wrapped around a core 3 of the sum-current transformer 2 to form a primary winding N1 of the transformer 2. Also, a secondary winding N2 is wrapped around the core 3 of the transformer 2, and the triggering circuit 5 is connected to the winding N2. Specifically, the triggering circuit 5 is connected across the output terminals of the winding N2, and the triggering relay 6 is connected across the output terminals of the circuit 5. The triggering relay 6 controls the switching mechanism 7 to selectively open the switch 8, and the switch 8 is provided in the path of the conductor network LN between the power company and the electrical device.

When the electric device in the user's home is operating or being handled under normal conditions, no fault currents exist. As a result, the vector sum of the currents flowing through the core 3 via the conductor network LN is zero. However, if a fault current $I_f$ is generated, the vector sum of the currents is not zero, and a voltage $U_e$ is generated across the secondary winding N2. The characteristics of the voltage $U_e$ correspond to the characteristics of the fault current $I_f$, and the triggering circuit 5 generates an output voltage $U_a$ based on the input voltage $U_e$. The output voltage $U_a$ causes an operating current $I_a$ to flow through the triggering relay 6. When the fault current If exceeds a triggering current $I_{trigger}$, the triggering circuit 5 triggers the relay 6. The triggering of the relay 6 causes the switching mechanism 7 to open the switch 8 to block the supply of current from the power company to at least one outlet in the user's home.

Since the value of residual operating current $I_a$ is based on the value of the fault current $I_f$, the relay 6 triggers when the fault current $I_f$ increases to a point that causes the current $I_a$ to flow. Accordingly, when the user contacts a conductive portion of an electric device and causes a large fault current $I_f$ to be generated, the relay 6 triggers, and switching mechanism 7 opens the switch 8. As a result, the dangerous fault current $I_f$ is no longer supplied to the user and will not harm the user. Similarly, if the insulation in the electric device is faulty and a large fault current $I_f$ is generated, the relay 6 triggers so that the switching mechanism 7 opens the switch 8. Thus, the dangerous fault current $I_f$ is no longer supplied to the electric device, and any possibility of the electric device starting a fire is eliminated.

However, since the circuit breaker 1 shown in FIG. 5 is implemented via hardware circuitry, the circuit breaker 1 is often activated when dangerous fault currents are not present, and thus, the circuit breaker 1 unnecessarily interrupts the operation of the electric device. For example, when one or more electric components connected to the conductor network LN are initially turned on, transient interference pulses are generated that have large amplitudes but last for only a short period of time. For example, as shown in FIG. 1, when the electric components are turned on, transient interference pulses typically occur from the time t=0 (i.e. $t_0$) to the time t=10 (i.e. $t_{a, min}$).

When such pulses (and similar pulses) are generated, the triggering circuit 5 outputs a current $I_a$ that triggers the relay 6, and the switching mechanism 7 causes the switch to prevent power from being supplied to the electric device. However, by the time the relay 6 triggers, the transient interference pulses no longer exist, and thus, circuit breaker 1 unnecessarily blocks the supply of the electrical power to the electric device. As a result, the operation of the electric device is unnecessarily stopped.

In an attempt to overcome the above problem, the hardware of the circuit breaker 1 has been redesigned to try to prevent it from triggering between the times to and $t_{a, min}$. However, the ability to successfully redesign the circuit breaker 1 to suppress the times at which it will trigger is limited because such hardware modification is expensive and complicated. For example, the additional circuitry needed to prevent the circuit breaker 1 from triggering at certain times adversely affects the values of the triggering times at which the circuit breaker 1 needs to trigger when a fault current is detected. In addition, the time periods during which the circuit breaker 1 should trigger (or not trigger) vary based on the specific applications under which the circuit breaker 1 is to operate and vary based on the different standards adopted by different countries. Since hardware circuitry is used to control the times when the circuit breaker 1 will trigger or not trigger, modifying the circuit breaker 1 so that it can operate under different applications and according to the standards of different countries is very time consuming and difficult.

SUMMARY OF THE INVENTION

One object of the present invention is to provide a fault or differential current detection system that accurately triggers when harmful fault currents and differential currents are detected and that does not erroneously trigger when harmless transient interference pulses are detected.

Another object of the present invention is to provide a fault or differential current detection system that can be easily mass-produced and that can be easily modified to work in many different environments.

In order to achieve the above and other objects, a fault or differential current detection software program is provided. The software program is contained in a computer readable medium and includes instructions to instruct a controller to perform a routine comprising: (a) inputting a detection signal corresponding to an abnormal current generated on a conductor; (b) determining if said abnormal current is greater than or equal to a first predetermined current based on said detection signal; (c) refraining from outputting a control signal for a predetermined delay period after said abnormal current is greater than or equal to said first predetermined current; (d) determining if said abnormal current is greater than or equal to a second predetermined current after said predetermined delay period is over; (e) determining if said abnormal current is a fault current after said abnormal current is greater than or equal to said second predetermined current; and (f) when said abnormal current is said fault current, outputting said control signal at least indirectly to a switch to instruct said switch to isolate said fault current from an electric device connected to said conductor.

In order to further achieve the above and other objects, another fault current detection software program is provided. This software program is also contained in a computer readable medium and includes instructions to instruct a controller to perform a routine comprising: (a) placing said controller in a sleep mode; (b) inputting a detection signal corresponding to an abnormal current generated on a conductor; (c) determining if said abnormal current is equal to or greater than a first predetermined current based on said detection signal; (d) changing an operational mode of said controller from said sleep mode to an active mode after said abnormal current becomes greater than or equal to said first predetermined current; (e) measuring an effective value of said abnormal current after said abnormal current becomes greater than or equal to said first predetermined current; (f) refraining from outputting a control signal while said operational mode of the said controller is changing in said step (c) and said effective value is being measured in said step (e); (g) determining if said effective value of said abnormal current is greater than or equal to a second predetermined current after effective value of said abnormal current is measured in step (e); (h) determining if said abnormal current is a fault current after said abnormal current becomes greater than or equal to said second predetermined current; and (i) when said abnormal current is said fault current, outputting said control signal at least indirectly to a switch to instruct said switch to isolate said fault current from an electric device connected to said conductor.

In order to yet further achieve the above and other objects, a fault current detection system is provided. The detection system detects a fault current generated on a conductive path supplying power to an electric device and prevents the fault current from being supplied to the electric device. The fault current detection system comprises: a detector that detects an abnormal current generated on said conductive path and outputs a corresponding detection signal; a switch that is provided in said conductive path that selectively isolates said electric device from said conductive path; and a controller that inputs said detection signal and determines if said abnormal current is greater than or equal to a first predetermined current based on said detection signal, wherein said controller refrains from outputting a control signal for a predetermined delay period after said abnormal current becomes greater than or equal to said first predetermined current, wherein said controller determines if said abnormal current is greater than or equal to a second predetermined current after said predetermined delay period is over, wherein said controller determines if said abnormal current is a fault current after said abnormal current becomes equal to or greater than said second predetermined current, and wherein, when said abnormal current is said fault current, said controller outputs said control signal at least indirectly to said switch to instruct said switch to isolate said fault current from said electric device.

In order to even further achieve the above and other objects, another fault current detection system is provided. The detection system detects a fault current generated on a conductive path supplying power to an electric device and prevents the fault current from being supplied to the electric device. The fault current detection system comprises: a detector that detects an abnormal current generated on said conductive path and outputs a corresponding detection signal; a switch that is provided in said conductive path that selectively isolates said electric device from said conductive path; and a controller that is placed in a sleep mode and inputs a detection signal corresponding to an abnormal current generated on said conductive path, wherein said controller determines if said abnormal current is greater than or equal to a first predetermined current based on said detection signal, wherein said controller changes an operational mode from said sleep mode to an active mode after said abnormal current becomes greater than or equal to said first predetermined current, wherein said controller measures an effective value of said abnormal current after said abnormal current becomes greater than or equal to said first predetermined current, wherein said controller refrains from outputting a control signal while said operational mode of the said controller is changing from said sleep mode to said active mode and while said effective value is being measured, wherein said controller determines if said effective value of said abnormal current is greater than or equal to a second predetermined current after said effective value of said abnormal current is measured, wherein said controller determines if said abnormal current is a fault current after said abnormal current becomes greater than or equal to said second predetermined current, and wherein, when said abnormal current is said fault current, said controller outputs said control signal at least indirectly to said switch to instruct said switch to isolate said fault current from an electric device connected to said conductive path.

BRIEF DESCRIPTION OF THE DRAWINGS

The above and other objectives and advantages of the present invention will become more apparent by describing in detail preferred embodiments thereof with reference to the attached drawings in which.

DETAILED DESCRIPTION OF THE PREFERRED EMBODIMENTS

The following description of the preferred embodiments discloses specific configurations, components, and process steps. However, the preferred embodiments are merely examples of the present invention, and thus, the specific features described below are merely used to more easily describe such embodiments and to provide an overall understanding of the present invention. Accordingly, one skilled in the art will readily recognize that the present invention is not limited to the specific embodiments described below. Furthermore, the descriptions of various configurations, components, and steps of the present invention that are known to one skilled in the art are omitted for the sake of clarity and brevity.

Figure 4:
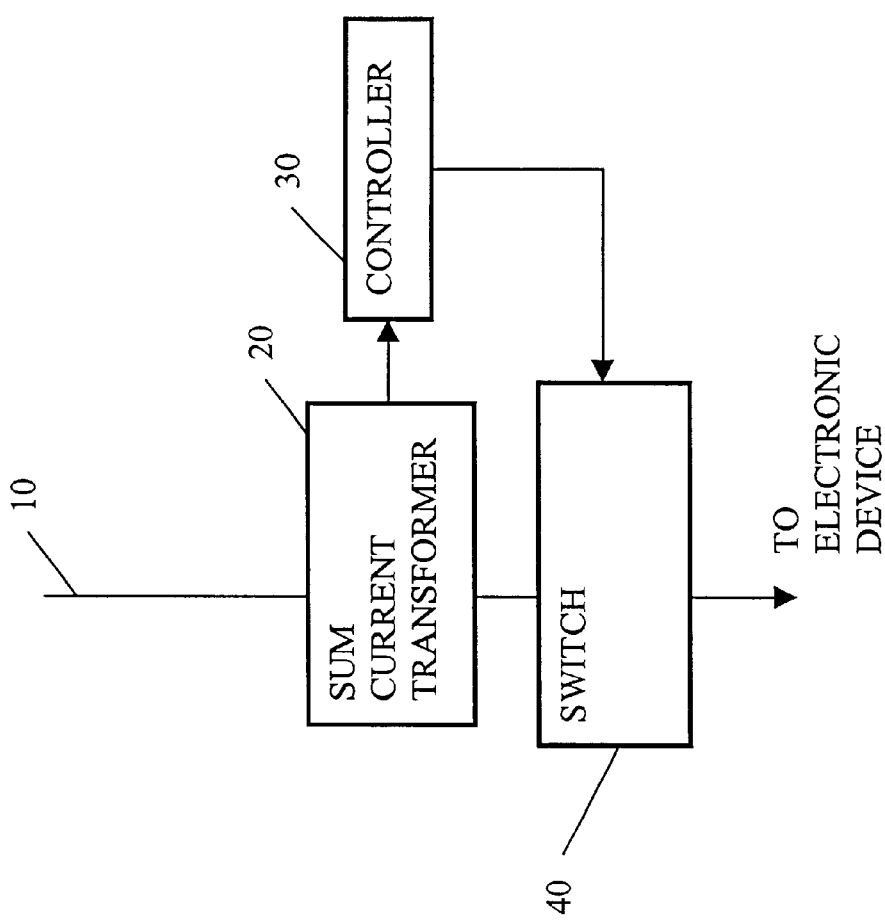
FIG. 4 is an example of a block diagram of the structure of a fault current detection system according to an illustrative embodiment of the present invention.
Figure 5:
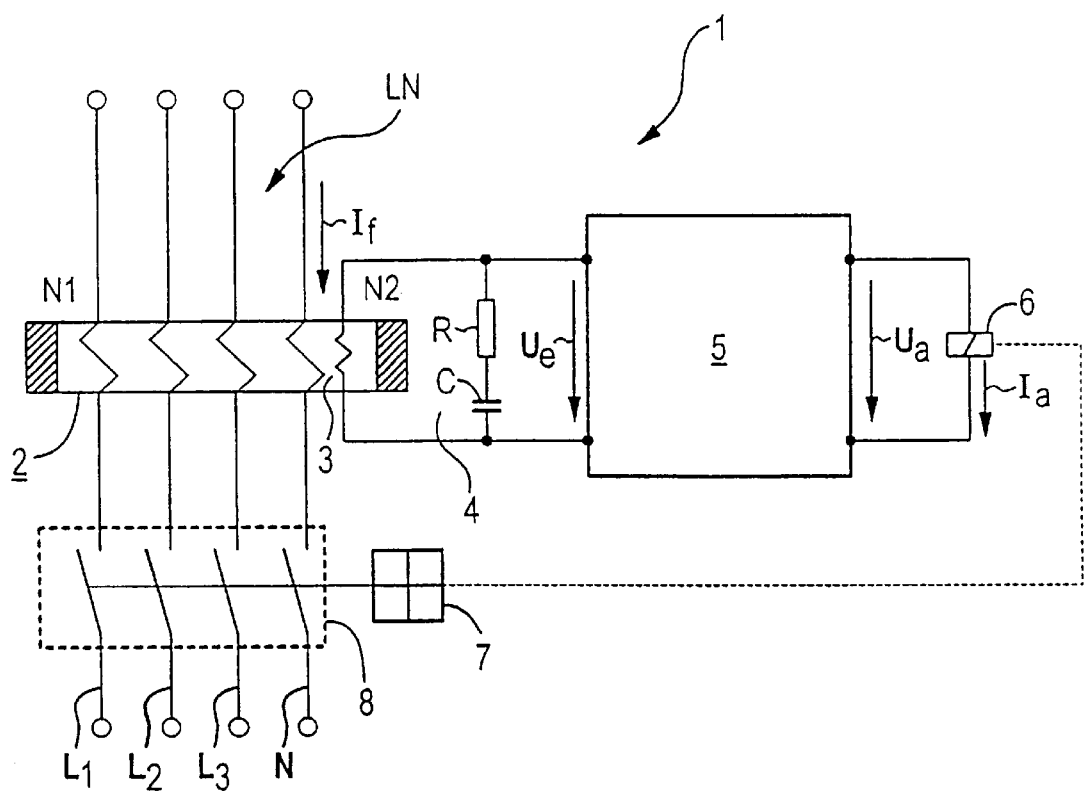
FIG. 5 is a block diagram of a circuit breaker that is implemented via hardware and that prevents power from being supplied to an electric device when a fault current is detected.

The present invention relates to a detection system that triggers and prevents a harmful fault or differential current from being supplied to an electric device and that does not trigger when a transient interference pulse is generated. An example of the structure of a detection system in accordance with an illustrative embodiment of the present invention is shown in FIG. 4. As shown in the figure, the detection system comprises a sum current transformer 20, a controller 30, and a switch 40. A conductor network 10 forms a primary winding of the sum current transformer 20 and is connected to an electric device via the switch 40. The configuration of and interconnections among the conductor network 10, sum current transformer 20, and switch 40 are preferably similar to those of the corresponding components shown in FIG. 5 and will not be discussed in greater detail for the sake of brevity.

The controller 30 receives a detection signal from the sum current transformer 20, and the characteristics of the detection signal correspond to characteristics of fault currents $I_f$ and/or transient interference pulses that are generated on the conductor network 10. The controller 30 filters out the portions of the detection signal that correspond to the transient interference pulses and analyzes the remaining portions of the detection signal to determine if any fault currents $I_f$ are generated in the conductor network 10. If a fault current $I_f$ does exist, the controller 30 determines if it is severe. If the fault current $I_f$ is severe, the controller 30 outputs a control signal to the switch 40 to instruct the switch 40 to block the supply of the fault current $I_f$ to the electric device. To more fully understand the advantages and other aspects of the present invention, a brief description of the generation of transient interference pulses and harmful fault and differential currents will be described in conjunction with FIGS. 1 and 2.

Figure 1:
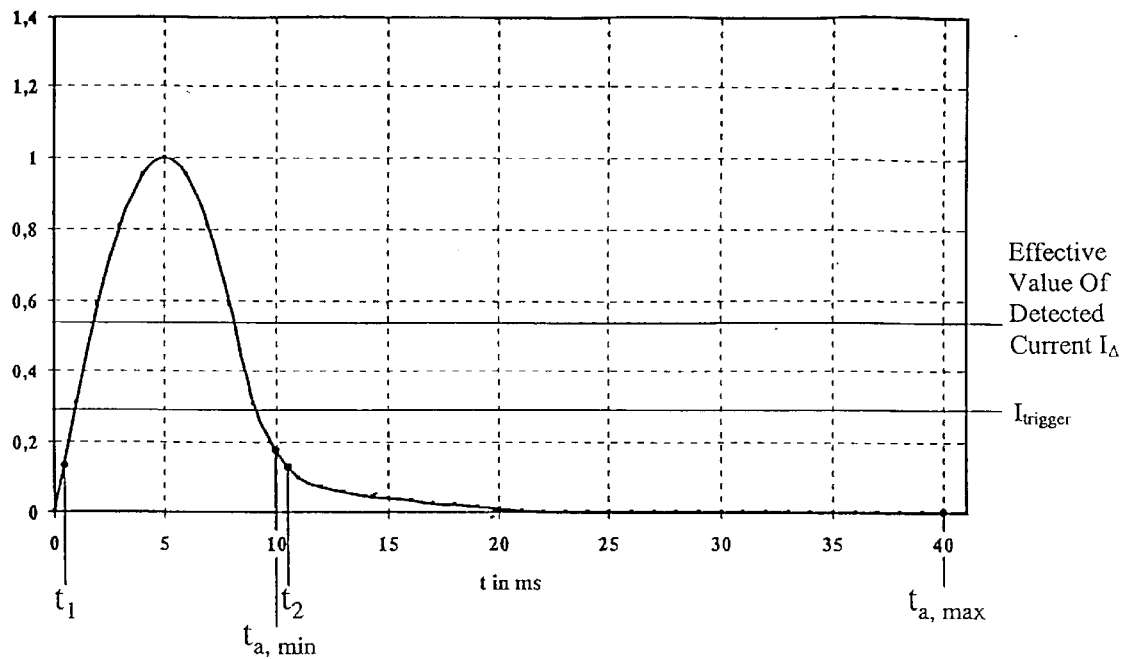
FIG. 1 is an example of a graphical representation of the generation of a transient interference pulse.

FIG. 1 is a graphical representation of the generation of a transient interference pulse that is generated when one or more electrical components connected to or embodied in the electric device are initially turned on. As shown in the figure, when one or more components are initially turned on at time t=0 (i.e. $t_0$), a transient interference pulse is often generated sometime between time to and time $t_{a, min}$ (e.g. t=10 ms). When the interference pulse is generated between the times $t_0$ and $t_{a, min}$, the controller 30 does not output a control signal to open the switch 40, and thus, the operation of the electric device is not interrupted. Furthermore, since a harmful fault current or differential current does not occur after the time $t_{a, min}$ in the example shown in FIG. 1, the controller 30 does not output a control signal to the switch 40 after the time $t_{a, min}$.

Figure 2:
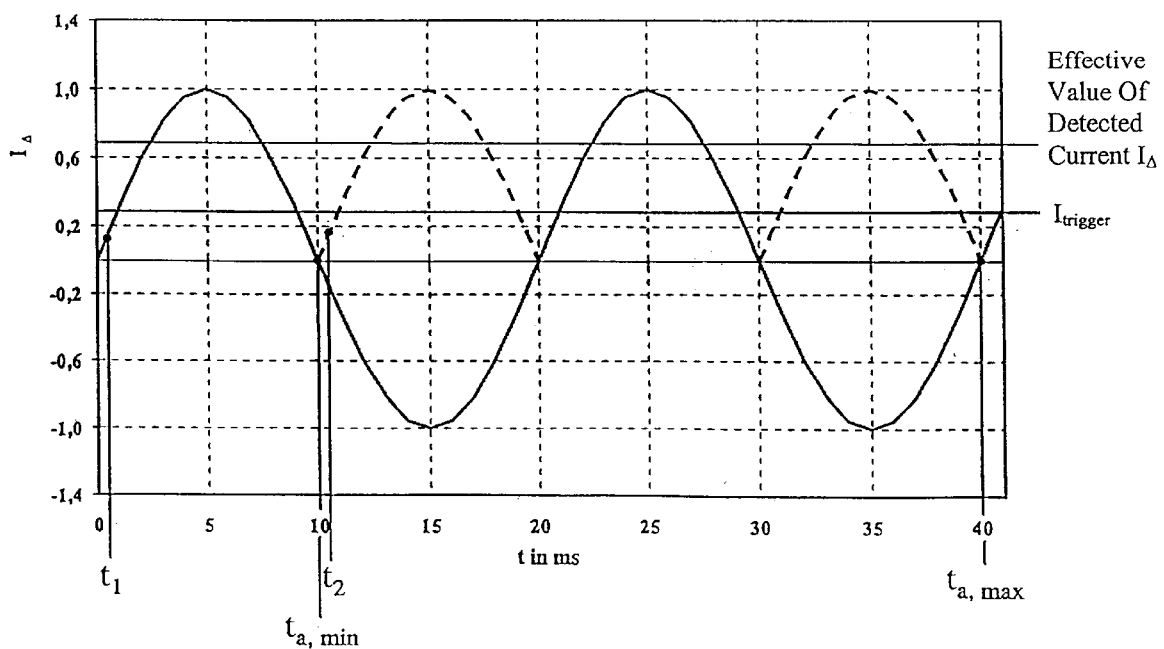
FIG. 2 is an example of a graphical representation of the generation of a harmful fault or differential current after a transient interference pulse is generated.

FIG. 2 is a graphical representation of the generation of a harmful fault or differential current. As shown in the figure, the fault or differential current is generated between the time $t_0$ and the time $t_{a, max}$. Furthermore, in the present embodiment, the detection system preferably detects the fault or differential current before the time $t_{a, max}$ (e.g. t=40 ms) to prevent the fault or differential current from beginning to harm a user that is operating the device or to prevent the device from starting a fire.

Based on the two scenarios described above in conjunction with FIGS. 1 and 2, the controller 30 does not trigger (i.e. output the control signal to the switch 40) during the time period when transient interference pulses are typically generated but does trigger before any fault currents cause harm. In particular, the controller 30 does not trigger between the times to and $t_{a, min}$ but does trigger between the times $t_{a, min}$ and $t_{a, max}$.

Figure 3:
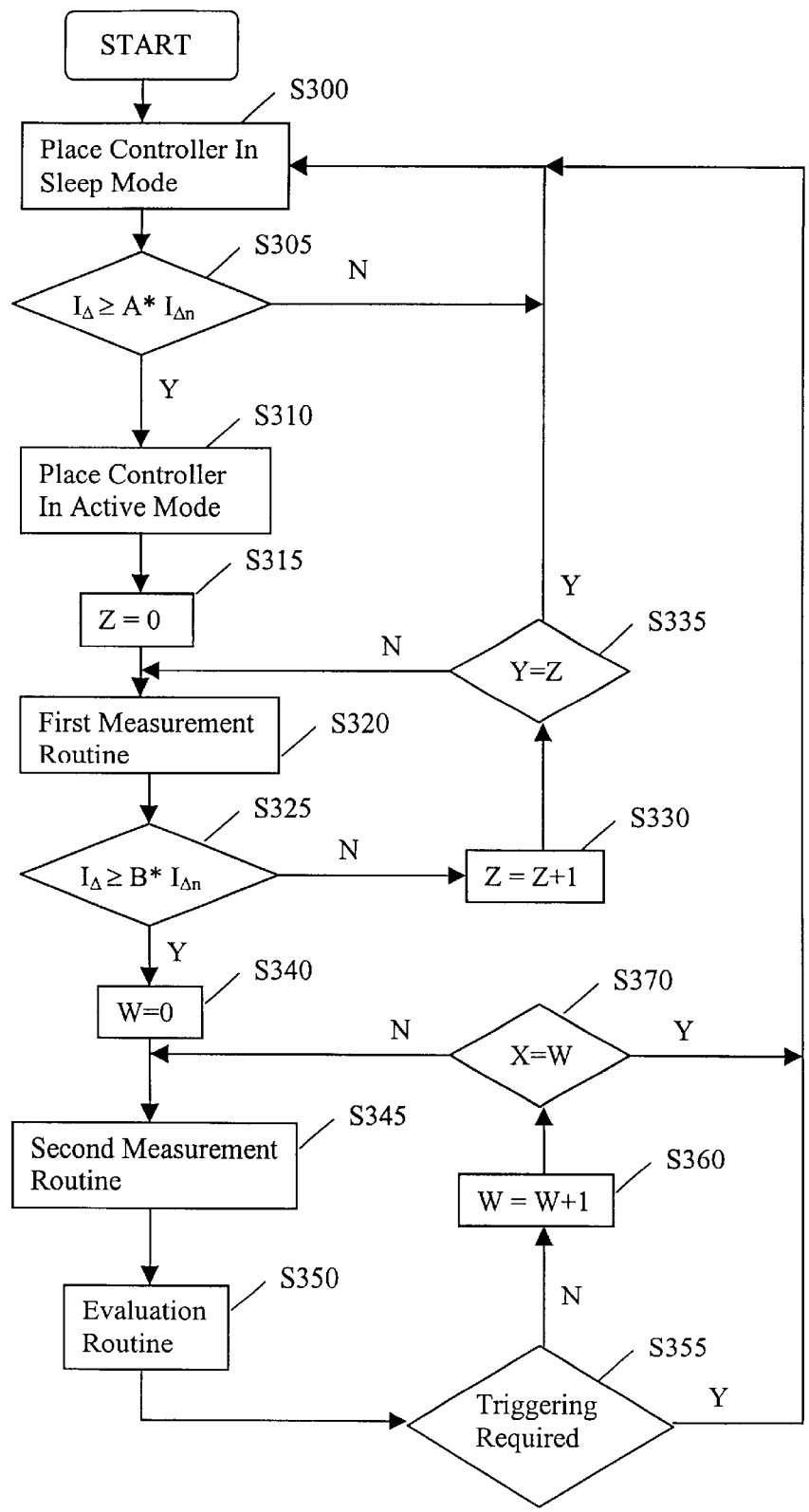
FIG. 3 is an example of a software routine performed by the detection system according to an illustrative embodiment of the present invention.

In a preferred embodiment, the operation of the controller 30 is controlled via a software program. The software program may be supplied to the controller 30 via a read only memory ("ROM"), a random access memory ("RAM"), a floppy disk, a hard disk, an optical disk, a carrier wave (e.g. a carrier wave transmitted via the internet, a vertical blanking interval of a television signal, etc.), or any other computer readable medium. An illustrative example of the software routine executed by the controller 30 is represented by the flow chart shown in FIG. 3.

As shown in the figure, the controller 30 is initially in a "sleep mode" or "power down" (step S300). In the sleep mode, certain subsystems (e.g. analog-to-digital converters, input/output systems, etc.) of the controller 30 are turned off in order conserve energy. While in the sleep mode, the controller 30 determines if an instantaneous value of a detected current $I_A$ (i.e. a fault current, differential current, transient interference pulse, etc.) is greater than or equal to a predetermined fraction A of a rated residual current (or nominal fault current) $I_{An}$ (step S305). In other words, the controller 30 determines if the following relationship is satisfied:

$$I_A \geq A * I_{An} \qquad (1)$$

The nominal fault current $I_{An}$ corresponds to the sensitivity of the detection system (i.e. corresponds to the smallest fault current $I_f$ that will cause the controller 30 to output the control signal to the switch 40) and is selected based on the standards of the electrical system in which the detection system is incorporated. Also, the parameter A is preferably a fraction having a value from 0.3 to 0.5. If the instantaneous value of the detected current $I_A$ is less than the predetermined fraction A of the nominal fault current $I_{An}$, the controller 30 remains in the sleep or power down mode (step S300).

On the other hand, if the instantaneous value of the detected current $I_A$ is greater than or equal to the predetermined fraction A of the nominal fault current $I_{\Delta n}$, the controller 30 enters an active mode, in which the controller 30 activates all of its subsystems (e.g. analog-to-digital converters, input/output systems, etc.) (step S310). A minimum idle time period $t_{idle}$, during which the controller 30 is idle, is required for the controller 30 to transition from the sleep mode or power mode to the active mode. Furthermore, in a preferred embodiment, a user can adjust one or more parameters in the software routine to increase the duration of the idle time period $t_{idle}$ during which the controller 30 is idle.

An example of when the controller 30 transitions from the sleep mode to the active mode is shown in FIGS. 1 and 2. Specifically, after various components connected to the electric device turn on at time $t_0$, the instantaneous value of the detected current $I_\Delta$ begins to rise. Then, when the value of the detected current $I_\Delta$ equals the predetermined fraction A of the nominal fault current $I_{\Delta n}$ at the time $t_1$, the controller 30 becomes active.

Afterwards, the controller 30 sets a first loop counter parameter Z equal to zero (step S315) and executes a first measurement routine during which the controller 30 measures and calculates the effective value of the detected current $I_\Delta$ (step S320). Suitable algorithms for determining the effective value of the detected current $I_\Delta$ are well known to one skilled in the art upon reading the specification, and therefore, they will not be described for the sake of brevity. Also, in the present embodiment, a minimum calculation time period $t_{calc}$ is required for the controller 30 to measure and calculate the effective value of the detected current $I_\Delta$. Furthermore, in a preferred embodiment, the user can adjust one or more parameters in the software routine to increase the duration of the calculation time period $t_{calc}$ during which the controller 30 is executing the first measurement routine.

The total amount of time for the controller 30 to (1) enter the active mode and (2) measure and calculate the effective value of the detected current $I_\Delta$ is considered to be the total delay time period $t_{delay}$. In other words, the total delay time period $t_{delay}$ equals the sum of the idle time period $t_{delay}$ and the calculation time period $t_{calc}$ as represented in the following equation:

$$t_{delay}=t_{idle}+t_{calc} \tag{2}$$

If the total delay time period $t_{delay}$ is set such that the period $t_{delay}$ ends at or after the time $t_{a,\ min}$ (FIGS. 1 and 2), the controller 30 will not trigger and will not output a control signal to the switch 40 in response to a transient interference pulse that is generated before the time $t_{a,\ min}$. (The time $t_{a,\ min}$ is the minimal trigger time before which the circuit breaker cannot trigger). In other words, the time period between the time $t_0$ and $t_{a,min}$ is the time period in which the system cannot trigger. In particular, the transient interference pulses typically have time durations of several milliseconds and typically occur between the times $t_0$ and $t_{a,min}$. Thus, if the period $t_{delay}$ ends at or after the time $t_{a,\ min}$, the controller 30 is still transitioning from the sleep or power down mode to the active mode and is calculating the effective value of the detected current $I_\Delta$ when the transient interference pulses occur. Thus, the controller 30 is busy performing such tasks when the transient interference pulses are generated and does trigger in response to such pulses. Furthermore, since the user can easily change the delay period $t_{delay}$ by simply changing various parameters in the software routine, the detection system can be easily modified and adapted to various electric devices, standards, and situations having different periods during which transient interference pulses occur.

An example of the relative timing of the times and periods described above are shown in FIGS. 1 and 2. Specifically, at the time $t_0$, various components connected to the electric device are turned on, and transient interference currents may occur between the times $t_0$ and $t_{a,\ min}$. As shown in FIGS. 1, a transient interference pulse (i.e. the detected current $I_\Delta$) increases from the time $t_0$, and at $t_1$, the instantaneous value of the detected current $I_\Delta$ equals the predetermined fraction A of the nominal fault current $I_{\Delta n}$. Thus, at time $t_1$, the controller 30 begins to transition from the sleep mode to the active mode and performs the first measurement routine to calculate the effective value of the detected current $I_\Delta$ during the delay period $t_{delay}$ (steps S305, S310, and S320 (FIG. 3)). By adjusting the parameters of the software routine, the delay period $t_{delay}$ can be adjusted such that the controller 30 finishes calculating the effective value of the detected current $I_\Delta$ in step S320 at time $t_2$. In other words, the period $t_{delay}$ is set to equal the difference between the time $t_2$ and the time $t_1$. Thus, before the time $t_2$, the controller 30 does not trigger and does not output a control signal to the switch. After the time $t_2$, the period $t_{delay}$ has ended, and the controller 30 is able to trigger. Accordingly, the controller 30 does not trigger in response to the transient interference pulses that occur between the times $t_0$ and $t_{a,\ min}$. Furthermore, while the controller 30 is calculating the effective value of the detected current $I_\Delta$, it refrains from outputting the calculated effective value until the time $t_2$.

After the time $t_2$ has passed and the controller 30 has calculated the effective value of the detected current $I_\Delta$ in step S320, it determines whether or not the effective value of the detected current $I_\Delta$ is greater than a second predetermined fraction B of the nominal fault current $I_{\Delta n}$ (step S325). In other words, at the time $t_2$, the controller 30 determines if the following relationship is satisfied:

$$I_{\Delta rms} \geq B^* I_{\Delta n} \tag{3}$$

The parameter B is preferably a fraction having a value from 0.3 to 0.5 and may or may not equal the parameter A mentioned previously. As long as the effective value of the detected current $I_\Delta$ is less than the fraction B of the nominal fault current $I_{\Delta n}$ (as in the situation shown in FIG. 1), the first measurement routine performed in step S320 is repeated a predetermined number of times. Specifically, if the effective value of the detected current $I_\Delta$ does not satisfy relationship (3), the controller 30 increments the first loop counter parameter Z by one (step S330) and determines if the parameter Z equals a predetermined number Y (step S335). The predetermined number Y preferably equals an integer between 1 and 30 and is a parameter that can be selected by the user. If the first loop counter parameter Z does not equal the predetermined number Y, the controller 30 performs the first measurement routine again to update the calculation of the effective value of the detected current $I_\Delta$ (step S320) and determines if the updated effective value satisfies relationship (3) above (step S325). If the effective value of the detected current $I_\Delta$ never satisfies relationship (3) when the first measurement routine is repeated for the predetermined number Y of times, the parameter Z equals the predetermined number Y (step S335), and the controller 30 again enters the sleep or power down mode (step S300).

On the other hand, if the effective value of the detected current $I_\Delta$ is greater than the fraction B of the nominal fault current $I_{\Delta n}$ (step S325), the controller 30 determines that a harmful fault current or differential current potentially exists, resets a second loop counter parameter W to zero (step S340), and performs a second measurement routine (step S345). In the second measurement routine, the controller 30 calculates the effective value $I_{Arms}$, the peak values $-\hat{I}_A$ and $+\hat{I}_A$, the period $T_{IA}$, and/or the frequency $f_{IA}$ of the detected current $I_A$ Suitable algorithms for determining the above values are well known to one skilled in the art upon reading the specification, and therefore, they will not be described for the sake of brevity.

Afterwards, the controller 30 performs an evaluation routine based on the calculated values to determine which type of fault current has occurred and the severity of the fault current (step S350). (An example of an evaluation routine is described in the U.S. patent application Ser. No. 09/590,098, which was invented by the inventors of the present application, entitled "SOFTWARE-CONTROLLED EVALUATION OF FAULT CURRENTS FOR PROTECTION AND MONITORING SYSTEMS". The disclosure of this concurrently filed application is hereby incorporated into the present application by reference.) Based on the evaluation routine, the controller 30 determines whether or not to trigger and output the control signal to the switch 40 (step S355). If triggering is required, the controller 30 outputs the control signal to the switch 40 (step S358) and returns to the sleep or power down mode (step S300).

On the other hand, if the controller 30 determines that triggering is not required (step S355), the second measurement routine (step S345) and the evaluation routine (step S350) are repeated a predetermined number X of times. Specifically, the controller 30 increments the second loop counting parameter W by one (step S360) and determines if the parameter W equals a predetermined number X (step S370). The predetermined number X preferably equals an integer between 1 and 50 that can be selected by the user. If the parameter W does not equal the predetermined number X, the controller 30 performs the second measurement routine again to update the calculations of the effective value $I_{Arms}$, peak values $-\hat{I}_A$ and $+\hat{I}_A$, period $T_{IA}$, and/or frequency $f_{IA}$ of the detected current $I_A$ (step S345). Then, the controller 30 performs the evaluation routine again (step S350). If the controller 30 is never triggered when the second measurement routine and evaluation routine are repeated for the predetermined number X of times, the second loop counting parameter W equals the predetermined number X (step S370), and the controller 30 again enters the sleep mode or power down mode (step S300).

As explained above, if the effective value of the detected current $I_A$ is less than a fraction B of the nominal fault current $I_{An}$ (step S325) the controller 30 repeats the first measurement routine (step S320) and comparison operation (step S325) a predetermined number of times. As a result, the controller 30 is capable of determining if a harmful fault current or differential current occurs shortly after a transient interference pulse. Similarly, if the controller 30 has not triggered after performing the evaluation routine (step S350), the controller 30 repeats the second measurement routine (step S345) and the evaluation routine (step S350) a predetermined number of times. Consequently, the controller 30 is able to detect a cyclical fault current or differential current that only periodically exceeds the triggering threshold level required for the controller 30 to output the control signal to the switch 40.

The illustrative embodiment of the detection system described above triggers when a harmful fault or differential current is detected. Furthermore, the detection system is designed so that it refrains from triggering in response to transient interference pulses without degrading its ability to detect harmful currents. In addition, since many of the operations performed by the detection system are based on parameters that are selected by a user, the detection system can be easily modified to be compatible with many different types of electric devices operating under many different types of standards.

The previous description of the preferred embodiments is provided to enable a person skilled in the art to make and use the present invention. Moreover, various modifications to these embodiments will be readily apparent to those skilled in the art, and the generic principles and specific examples defined herein may be applied to other embodiments without the use of inventive faculty. For instance, the above examples refer to parameters that have specific values or ranges of values and refer to procedures that detect specific types of currents. However, the present invention is not limited to such parameters having such values and is not limited to the detection of such currents. Therefore, the present invention is not intended to be limited to the embodiments described herein but is to be accorded the widest scope as defined by the limitations of the claims and equivalents thereof.

What is claimed is:

1. A fault or differential current detection software program contained in a computer readable medium, wherein the fault or differential current detection software program includes instructions to instruct a controller to perform a routine comprising:

(a) determining if a detected current generated on a conductor is greater than or equal to a first predetermined current threshold based on a detection signal corresponding to said detected current;

(b) refraining from outputting a control signal for a predetermined delay period after said detected current is greater than or equal to said first predetermined threshold;

(c) determining if said detected current is greater than or equal to a second predetermined current threshold after said predetermined delay period is over;

(d) determining if said detected current is a fault or differential current after said detected current is greater than or equal to said second predetermined current threshold; and (e) when said detected current is said fault or differential current, outputting said control signal at least indirectly to a switch to instruct said switch to isolate said fault current from an electric device connected to said conductor.

2. The fault or differential current detection software program as claimed in claim 1, wherein said predetermined delay period is adjustable by a user of said software program.

3. The fault or differential current detection software program as claimed in claim 1, wherein the routine further comprises:

(f) placing the controller in a sleep or power down mode, and wherein said step (b) comprises:

(b1) changing an operational mode of said controller from said sleep or power down mode to an active mode, wherein a predetermined idle period elapses when said operational mode changes from said sleep mode to said active mode, wherein said predetermined idle period constitutes at least a portion of said predetermined delay period, and wherein said controller refrains from outputting said control signal during said predetermined idle period.

4. The fault or differential current detection software program as claimed in claim 1, wherein said step (b) comprises:
   (b1) measuring an effective value of said detected current,
      wherein a predetermined measurement period elapses when said effective value of said detected current is measured,
      wherein said predetermined measurement period constitutes at least a portion of said predetermined delay period, and
      wherein said controller refrains from outputting said control signal during said predetermined measurement period.

5. The fault or differential current detection software program as claimed in claim 1, wherein the routine further comprises:
   (f) placing said controller in a sleep or power down mode, and wherein said step (b) comprises:
      (b1) changing an operational mode of said controller from said sleep or power down mode to an active mode; and
      (b2) measuring an effective value of said detected current,
         wherein a predetermined idle period elapses when said operational mode changes from said sleep mode to said active mode,
         wherein a predetermined measurement period elapses when said effective value of said detected current is measured,
         wherein said predetermined idle period and said predetermined measurement period constitute at least a portion of said predetermined delay period, and
         wherein said controller refrains from outputting said control signal during said predetermined idle period and said predetermined measurement period.

6. The fault or differential current detection software program as claimed in claim 5, wherein at least one of said predetermined idle period and said predetermined measurement period is adjustable by a user of said software program.

7. The fault or differential current detection software program as claimed in claim 1, wherein said predetermined delay period expires after a period during which transient interference pulses are generated on said conductor.

8. The fault or differential current detection software program as claimed in claim 4, wherein said step (c) comprises:
   (c1) determining if said effective value of said detected current is greater than or equal to said second predetermined current threshold after said predetermined delay period is over; and
   (c2) repeating said steps (b1) and (c1) if said effective value of said detected current is less than said second predetermined current value.

9. The fault or differential current detection software program as claimed in claim 8, wherein said step (c2) repeats said steps (b1) and (c1) a predetermined number of times if said effective value of said detected current is less than said second predetermined current threshold.

10. The fault or differential current detection software program as claimed in claim 1, wherein said step (d) comprises:
    (d1) measuring at least one characteristic of said detected current;
    (d2) determining if said detected current is said fault or differential current based on said at least one characteristic; and
    (d3) repeating said steps (d1) and (d2) if said detected current is determined not to be said fault or differential current.

11. The fault or differential current detection software program as claimed in claim 10, wherein said step (d3) repeats said steps (d1) and (d2) a predetermined number of times if said detected current is determined not to be said fault or differential current.

12. A fault or differential current detection software program contained in a computer readable medium, wherein the fault or differential current detection software program includes instructions to instruct a controller to perform a routine comprising:
    (a) placing said controller in a sleep or power down mode;
    (b) determining if a detected current generated on a conductor is greater than or equal to a first predetermined current threshold based on a detection signal corresponding to said detected current;
    (c) changing an operational mode of said controller from said sleep or power down mode to an active mode after said detected current becomes greater than or equal to said first predetermined current threshold;
    (d) measuring an effective value of said detected current after said detected current becomes greater than or equal to said first predetermined current threshold;
    (e) refraining from outputting a control signal while said operational mode of the said controller is changing in said step (c) and said effective value is being measured in said step (d);
    (f) determining if said effective value of said detected current is greater than or equal to a second predetermined current threshold after said effective value of said detected current is measured in step (d);
    (g) determining if said detected current is a fault or differential current after said detected current becomes greater than or equal to said second predetermined current threshold; and
    (h) when said detected current is said fault or differential current, outputting said control signal at least indirectly to a switch to instruct said switch to isolate said fault or differential current from an electric device connected to said conductor.

13. The fault or differential current detection software program as claimed in claim 12, wherein said step (f) comprises:
    (f1) determining if said effective value of said detected current is greater than or equal to said second predetermined current threshold;
    (f2) repeating said steps (d) and (f1) if said detected current is less than said second predetermined current threshold.

14. The fault or differential current detection software program as claimed in claim 13, wherein step (f2) comprises:
    (f2a) repeating said steps (d) and (f1) a predetermined number of times if said effective value of said detected current is less than said second predetermined current threshold; and
    (f2b) placing said controller in said sleep or power down mode after said steps (d) and (f1) have been repeated for said predetermined number of times.

15. The fault or differential current detection software program as claimed in claim 12, wherein said step (g) comprises:
    (g1) measuring at least one characteristic of said detected current;

(g2) determining if said detected current is said fault or differential current based on said at least one characteristic; and (g3) repeating said steps (g1) and (g2) if said abnormal current is determined not to be said fault or differential current.

16. The fault or differential current detection software program as claimed in claim 15, wherein step (g3) comprises:

(g3a) repeating said steps (g1) and (g2) a predetermined number of times if said detected current is not said fault or differential current; and (g3b) placing said controller in said sleep or power down mode after said steps (g1) and (g2) have been repeated for said predetermined number of times.

17. The fault or differential current detection software program as claimed in claim 12, wherein a predetermined idle period elapses when said operational mode changes from said sleep or power down mode to said active mode in said step (c), wherein a predetermined measurement period elapses when said effective value of said detected current is measured in said step (d), and wherein said predetermined idle period and said predetermined measurement period constitute at least a portion of a predetermined delay period.

18. The fault or differential current detection software program as claimed in claim 17, wherein at least one of said predetermined measurement period and said predetermined idle period is adjustable by a user of said software program.

19. The fault or differential current detection software program as claimed in claim 18, wherein said predetermined delay period expires after a period during which transient interference pulses are generated on said conductor.

20. A fault or differential current detection system that detects a fault or differential current generated on a conductive path supplying power to an electric device and that prevents the fault or differential current from being supplied to the electric device, wherein the fault or differential current detection system comprises:

a detector that detects a detected current generated on said conductive path and outputs a corresponding detection signal;

a switch that is provided in said conductive path that selectively isolates said electric device from said conductive path; and a controller that inputs said detection signal and determines if said detected current is greater than or equal to a first predetermined current threshold based on said detection signal, wherein said controller refrains from outputting a control signal for a predetermined delay period after said detected current becomes greater than or equal to said first predetermined current threshold, wherein said controller determines if said detected current is greater than or equal to a second predetermined current threshold after said predetermined delay period is over;

wherein said controller determines if said detected current is a fault or differential current after said detected current becomes greater than or equal to said second predetermined current threshold, and wherein, when said detected current is said fault or differential current, said controller outputs said control signal at least indirectly to said switch to instruct said switch to isolate said fault or differential current from said electric device.

21. The fault or differential current detection system as claimed in claim 20, wherein said predetermined delay period is adjustable by a user.

22. The fault or differential current detection system as claimed in claim 20, wherein said controller is placed in a sleep or power down mode, and wherein said controller changes an operational mode from said sleep or power down mode to an active mode after said detected current becomes greater than or equal to said first predetermined current threshold, wherein a predetermined idle period elapses when said operational mode changes from said sleep or power down mode to said active mode, wherein said predetermined idle period constitutes at least a portion of said predetermined delay period, and wherein said controller refrains from outputting said control signal during said predetermined idle period.

23. The fault or differential current detection system as claimed in claim 20, wherein said controller measures an effective value of said detected current after said detected current is greater than or equal to said first predetermined current threshold, wherein a predetermined measurement period elapses when said effective value of said detected current is measured, wherein said predetermined measurement period constitutes at least a portion of said predetermined delay period, and wherein said controller refrains from outputting said control signal during said predetermined measurement period.

24. The fault or differential current detection system as claimed in claim 20, wherein said controller is placed in a sleep or power down mode, wherein said controller changes an operational mode from said sleep or power down mode to an active mode after said detected current is greater than or equal to said first predetermined current threshold, wherein said controller measures an effective value of said detected current after said detected current is greater than or equal to said first predetermined current threshold, wherein a predetermined idle period elapses when said operational mode changes from said sleep or power down mode to said active mode, wherein a predetermined measurement period elapses when said effective value of said detected current is measured, wherein said predetermined idle period and said predetermined measurement period constitute at least a portion of said predetermined delay period, and wherein said controller refrains from outputting said control signal during said predetermined idle period and said predetermined measurement period.

25. The fault or differential current detection system as claimed in claim 24, wherein at least one of said predetermined idle period and said predetermined measurement period is adjustable by a user.

26. The fault or differential current detection system as claimed in claim 20, wherein said predetermined delay period expires after a period during which transient interference pulses are generated on said conductive path.

27. The fault or differential current detection system as claimed in claim 23, wherein, when said effective value of said abnormal current is less than said second predetermined current threshold, said controller repeatedly measures said effective value of said detected current and repeatedly determines if said effective value of said detected current is greater than or equal to said second predetermined current threshold.

28. The fault or differential current detection system as claimed in claim 27, wherein, when said effective value is less than said second predetermined current threshold, said controller repeatedly measures said effective value and repeatedly determines if said effective value is greater than or equal to said second predetermined current threshold for a predetermined number of times.

29. The fault or differential current detection system as claimed in claim 20, wherein said controller measures at least one characteristic of said detected current after said detected current becomes greater than or equal to said second predetermined current threshold,
   wherein said controller determines if said detected current is said fault or differential current based on said at least one characteristic, and
   wherein said controller repeatedly measures said at least one characteristic and repeatedly determines if said detected current is said fault or differential current if said detected current has not previously been determined to be said fault or differential current.

30. The fault or differential current detection system as claimed in claim 29, wherein, if said detected current has not previously been determined to be said fault or differential current, said controller repeatedly measures said at least one characteristic and repeatedly determines if said detected current is said fault or differential current a predetermined number of times.

31. A fault or differential current detection system that detects a fault or differential current generated on a conductive path supplying power to an electric device and that prevents the fault or differential current from being supplied to the electric device, wherein the fault or differential current detection system comprises:
   a detector that detects a detected current generated on said conductive path and outputs a corresponding detection signal;
   a switch that is provided in said conductive path that selectively isolates said electric device from said conductive path; and
   a controller that is placed in a sleep or power down mode and inputs a to detection signal corresponding to said detected current generated on said conductive path,
   wherein said controller determines if said detected current is greater than or equal to a first predetermined current threshold based on said detection signal,
   wherein said controller changes an operational mode from said sleep or power down mode to an active mode after said detected current becomes greater than or equal to said first predetermined current threshold,
   wherein said controller measures an effective value of said detected current after said detected current becomes greater than or equal to said first predetermined current threshold,
   wherein said controller refrains from outputting a control signal while said operational mode of the said controller is changing from said sleep or power down mode to said active mode and while said effective value is being measured,
   wherein said controller determines if said effective value of said detected current is greater than or equal to a second predetermined current threshold after said effective value of said detected current is measured,
   wherein said controller determines if said detected current is a fault or differential current after said detected current becomes greater than or equal to said second predetermined current threshold, and
   wherein, when said detected current is said fault or differential current, said controller outputs said control signal at least indirectly to said switch to instruct said switch to isolate said fault or differential current from an electric device connected to said conductive path.

32. The fault or differential current detection system as claimed in claim 31, wherein, if said detected current is less than said second predetermined current threshold, said controller repeatedly measures said effective value of said detected current and repeatedly determines if said effective value of said detected current is greater than or equal to said second predetermined current threshold.

33. The fault or differential current detection system as claimed in claim 32, wherein when said detected current is less than said second predetermined current threshold, said controller repeatedly measures said effective value and repeatedly determines if said effective value is greater than or equal to said second predetermined current threshold a predetermined number of times, and
   wherein, after said controller has repeatedly measured said effective value and has repeatedly determined if said effective value is greater than or equal to said second predetermined current threshold a predetermined number of times, said controller is placed in said sleep or power down mode.

34. The fault or differential current detection system as claimed in claim 31, wherein said controller measures at least one characteristic of said detected current after said detected current becomes greater than or equal to said second predetermined current threshold,
   wherein said controller determines if said detected current is said fault or differential current based on said at least one characteristic, and
   wherein, when said detected current is determined not to be said fault or differential current, said controller repeatedly measures said at least one characteristic and determines if said detected current is said fault or differential current based on said at least one characteristic.

35. The fault or differential current detection system as claimed in claim 34, wherein, when said detected current is determined not to be said fault or differential current, said controller repeatedly measures said at least one characteristic and determines if said detected current is said fault or differential current based on said at least one characteristic for a predetermined number of times, and
   wherein, after said controller has repeatedly measured said at least one characteristic and has determined if said detected current is said fault or differential current based on said at least one characteristic for a predetermined number of times, said controller is placed in said sleep or power down mode.

36. The fault or differential current detection system as claimed in claim 31, wherein a predetermined idle period elapses when said controller changes said operational mode changes from said sleep or power down mode to said active mode,
   wherein a predetermined measurement period elapses when said controller measures said effective value of said detected current after said detected current becomes greater than or equal to said first predetermined current threshold, and wherein said predetermined idle period and said predetermined measurement period constitute at least a portion of a predetermined delay period.

37. The fault or differential current detection system as claimed in claim 36, wherein at least one of said predetermined measurement period and said predetermined idle period is adjustable by a user.

38. The fault or differential current detection system as claimed in claim 37, wherein said predetermined delay period expires after a period during which transient interference pulses are generated on said conductive path.

39. A fault or differential current detection software program contained in a computer readable medium, wherein the fault or differential current detection software program includes instructions to instruct a controller to perform a routine comprising:

(a) determining if an instantaneous value of a current generated on a (b) when said instantaneous value of said current is greater than or equal to said first predetermined current threshold, determining an effective value of said current;

(c) determining if said effective value of said current is greater than or equal to a second predetermined current threshold; and (d) when said effective value of said current is greater than or equal to said second predetermined current threshold, determining if said current is a fault or differential current.

40. The fault or differential current detection software program as claimed in claim 39, wherein said step (d) comprises:

(d1) when said effective value of said current is greater than or equal to said second predetermined threshold, determining if said current is a fault or differential current;

(d2) when said effective value of said current is less than said second predetermined threshold, updating said effective value of said current and repeating said steps (d1) and (d2) until said effective value of said current is greater than or equal to said second predetermined threshold or until said steps (d1) and (d2) have been repeated a first predetermined number of times.

41. The fault or differential current detection software program as claimed in claim 40, wherein said step (d1) comprises:

(d1a) when said current is determined to be a fault or differential current, outputting a control signal; and (d1b) when said current is determined not to be a fault or differential current, updating said effective value of said current and repeating said steps (d1a) and (d1b) until said current is determined to be a fault current or until said steps (d1a) and (d1b) have been repeated a second predetermined number of times.

42. The fault or differential current detection software program as claimed in claim 41, wherein at least one of said first predetermined current threshold, said second predetermined current threshold, said first predetermined number of times, and said second predetermined number of times can be selected by a user of the software program.

43. The fault or differential current detection software program as claimed in claim 42, wherein all of said first predetermined current threshold, said second predetermined current threshold, said first predetermined number of times, and said second predetermined number of times can be selected by a user of the software program.

* * * * *